W. J. WICHMANN.
STOCK WATERING TANK.
APPLICATION FILED OCT. 5, 1915.
1,177,585.
Patented Mar. 28, 1916.
2 SHEETS—SHEET 1.
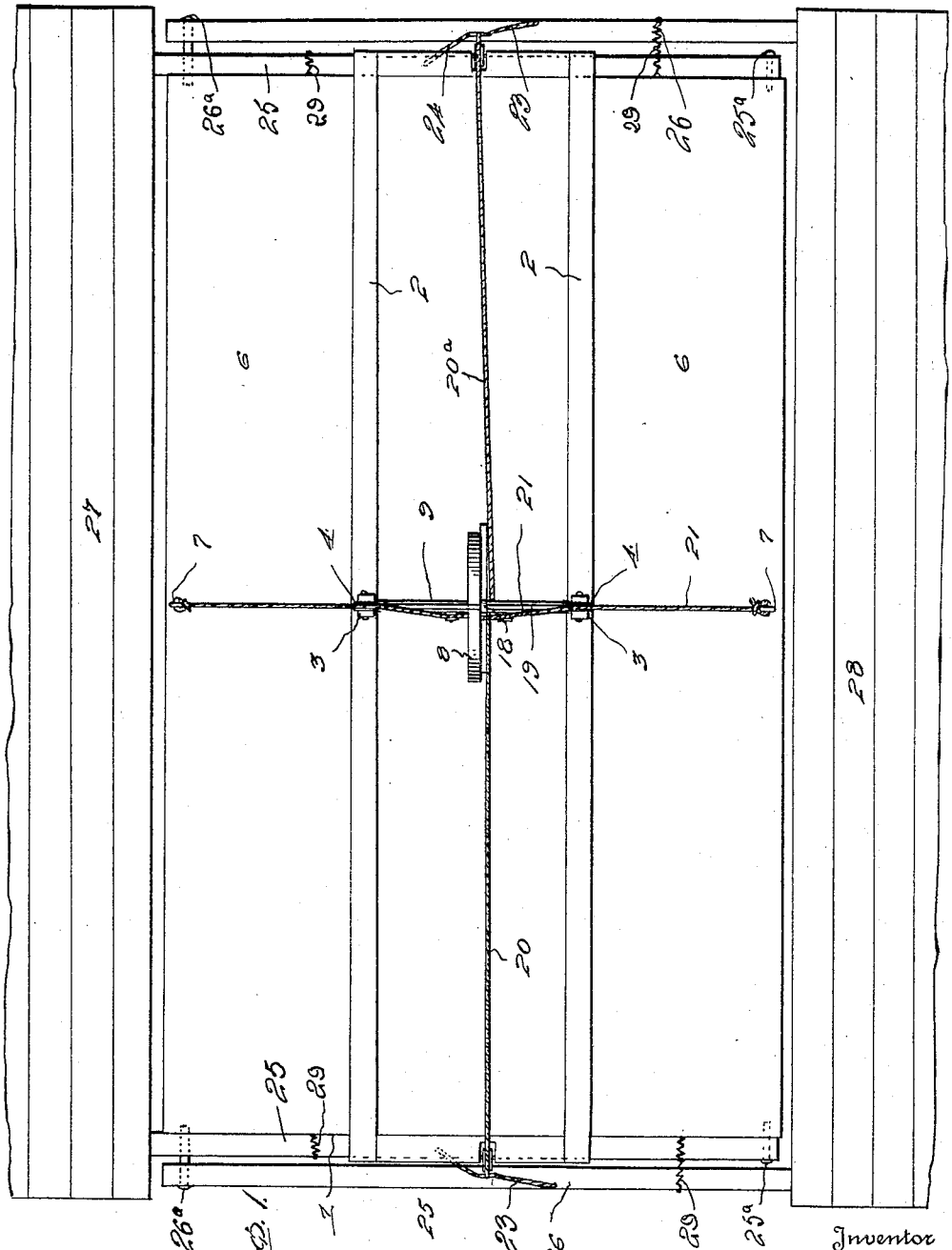
Fig. 1.
Witnesses
Inventor
W. J. Wichmann
By 
Attorney W. J. WICHMANN.
STOCK WATERING TANK.
APPLICATION FILED OCT. 5, 1915.
1,177,585.
Patented Mar. 28, 1916.
2 SHEETS—SHEET 2.
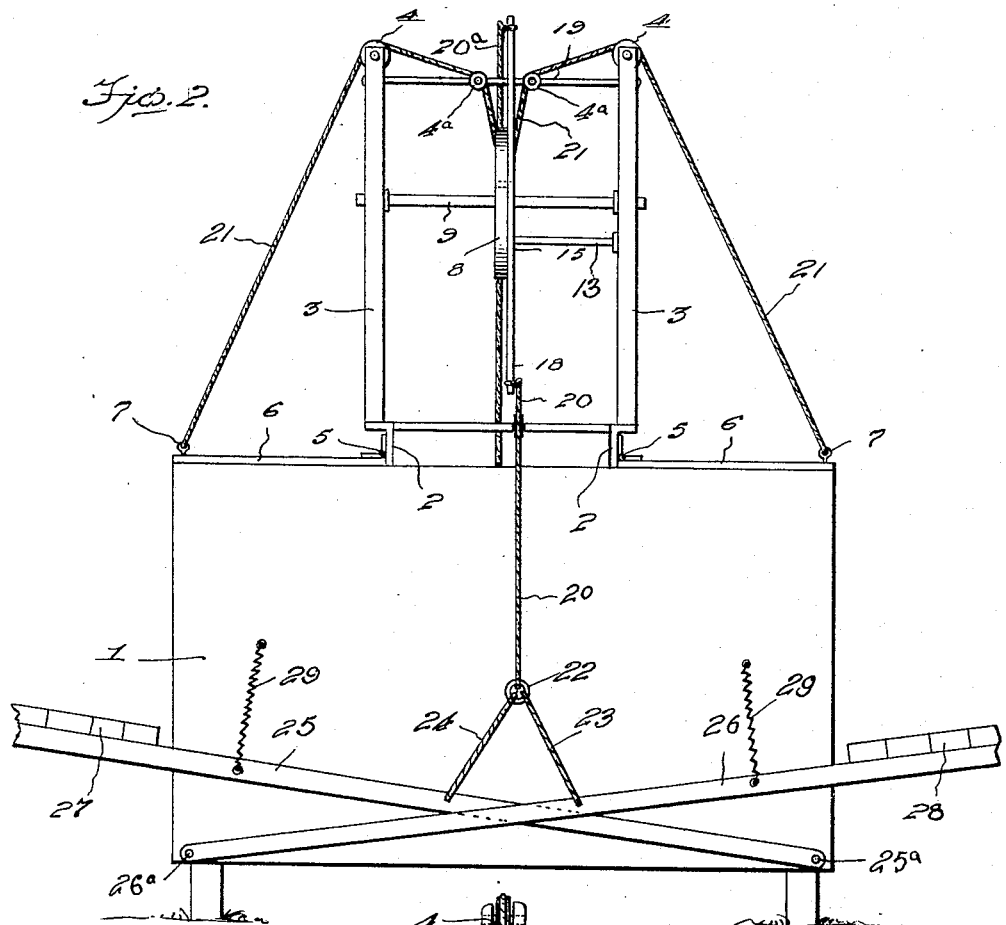
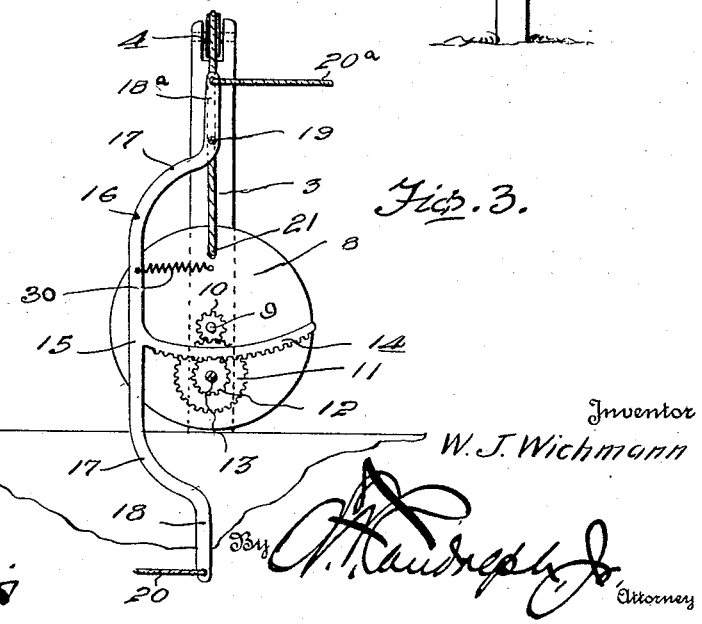
Witnesses
Inventor
W. J. Wichmann
By
Attorney

UNITED STATES PATENT OFFICE.

WILLIAM J. WICHMANN, OF TIGERTON, WISCONSIN.

STOCK-WATERING TANK.

1,177,585.   Specification of Letters Patent.   Patented Mar. 28, 1916.

Application filed October 5, 1915. Serial No. 54,225.

*To all whom it may concern:*

Be it known that I, WILLIAM J. WICHMANN, a citizen of the United States, residing at Tigerton, in the county of Shawano and State of Wisconsin, have invented certain new and useful Improvements in Stock-Watering Tanks; and I do hereby declare the following to be a full, clear, and exact description of the invention, such as will enable others skilled in the art to which it appertains to make and use the same.

This invention relates to new and useful improvements in stock watering tanks and the principal object of the invention is to provide a device to close the tank and prevent the entrance of foreign matter thereinto.

Another object of the invention is to avoid the possibility of a person falling into the tank and becoming injured.

Still another object of the invention is to provide a tank, the lids of which are open upon the positioning of weight upon a platform so that the device will be automatically operated when an animal approaches the tank.

With these and other objects in view, the invention consists in the novel combination and arrangement of parts as will be fully set forth in the following specification and accompanying drawings, in which:—

Figure 1 is a top plan view of a tank constructed in accordance with this invention. Fig. 2 is an end elevation of the tank, and Fig. 3 is a detail fragmentary view of the tank, showing the lid actuating mechanism in detail.

Referring now to the drawings by characters of reference, the numeral 1 designates a tank of the ordinary construction provided with a pair of longitudinally extending parallel bars 2. These bars 2 are preferably angle bars and are provided intermediate their ends with the standards 3, the upper ends of which are bifurcated and provided with the rollers or pulleys 4. Hingedly secured as at 5 to the outer sides of the bars 2 are the covers or lids 6, the outer edges of which lie on the upper edges of the walls of the tank and are provided with suitable eyes 7, the use of which will be more fully hereinafter described.

The opening mechanism for the covers or lids 6 is best illustrated in Fig. 3 and comprises a disk 8 rotatably mounted on a suitable shaft 9, which is secured to and located between the standards 3, and secured to this disk is a pinion 10 which meshes with the spur gear 11 having secured thereto the pinion 12 and this spur gear 11 and the pinion 12 is rotatably mounted on a stub shaft 13 which is secured at one end in any suitable manner to one of the standards 3. The stub shaft 13 extends from the standard to which it is secured in the direction of the disk 8.

Meshing with the pinion 12 is an arcuate rack bar 14 formed on the vertical arm or bight portion 15 of the lever designated generally by the numeral 16, the curved arms 17 of which terminate in the vertical extensions 18 and 18$^a$. The upper extension 18$^a$ is pivotally mounted on the rod 19 which is secured to and located between the upper ends of the standards 3. The ends of the extensions 18 and 18$^a$ are formed with openings through which the flexible members 20 and 20$^a$ extend.

The disk 8 is formed with an opening through which a rope or flexible member 21 passes and this flexible member 21 also extends over the pulleys 4 and 4$^a$ and has its opposite ends connected to the eyes 7 hereinbefore referred to. The pulleys 4$^a$ are journaled on the rod 19. The flexible members 20 and 20$^a$ project longitudinally of the tank 1 in opposite directions from the arms 18 and 18$^a$, and after passing over pulleys 20$^b$ they extend down along the ends of the tank 1. The lower ends of the members 20$^a$ and 20 have attached thereto rings 22 to each of which are attached the upper ends of a pair of flexible members 23 and 24. The lower ends of the members 23 are secured to a pair of arms 25 and the lower ends of the members 24 are secured to a pair of arms 26. The arms 25 are relatively spaced, and are arranged one at each end of the tank 1. These arms are each pivoted at one end to the ends of the tank 1, near one side of the tank as at 25$^a$, and they extend from their pivots in the direction of and beyond the opposite side of the tank, a platform 27 being secured to the projecting ends of the arms. The arms 26 are also relatively spaced and arranged one at each end of the tank 1. These are each pivoted at one end to ends of the tank 1 near said opposite side, as at 26$^a$, and they extend from their pivots in the direction of and beyond the opposite side of the tank. A platform 28 is secured to the projecting ends of these arms. The platforms 27 and 28 are held normally elevated by springs 29 which are secured at their upper ends to the end of the tank 1 and at their lower ends to the arms 25 and 26.

It will be apparent from the foregoing that in use the animal approaches the tank and in doing so steps upon one of the platforms 27 and 28, which will be immediately forced downwardly. The downward movement of either the platforms 27 or 28 exerts a pull upon both members 20 and 20ª. The pull on the flexible members 20 will cause the lever 16 to swing on its pivot so that the rack bar 14 will transmit rotation to the spur gear 12 and thence the spur gear 11 through the pinion 10, thereby causing the disk to revolve and exerting pull on the flexible member 21 so that the lids on each side of the device will be simultaneously raised. After the animal steps off of the platform the spring 29 will return it to its normally elevated position, releasing the pull upon the members 20 and 20ª. Upon releasing the pull on the members 20 and 20ª the retractile coil spring 30 will act to return the lever 16 to its normal position, as shown in Fig. 3, and thereby permit the lids or covers 6 to descend so that the tank will remain closed except when the same is in use.

From the foregoing it will be apparent that a particularly simple and efficient mechanism is provided for automatically raising and lowering the trough covers upon the approach and the exit of an animal from the platform.

While in the foregoing there has been shown and described the preferred embodiment of this invention, it is to be understood that such changes may be made in the combination and arrangement of parts as will fall within the spirit and scope of the appended claims.

What is claimed is:—

1. In combination, a tank provided with hinged covers, platforms near the tank, a disk rotatably mounted centrally of the tank, means connecting the disk with the covers so that when the same is rotated the covers will be opened and means connected with relation to the platforms to cause the disk to rotate upon the downward movement of either platform.

2. In combination, a tank having hinged covers, a disk rotatably mounted centrally of the tank between the covers, platforms extending longitudinally of the tank, a lever actuated upon downward movement of the platforms and adapted to rotate the disk and means connected to the disk and to the covers so that upon rotation of the disk the covers will be opened.

3. In combination, a tank provided with hinged covers, standards extending upwardly centrally of the tank, a disk rotatably mounted between the standards, a lever pivoted between the standards adjacent the disk, an arcuate rack bar on the lever, a pinion on the disk, said rack bar actuating the pinion to cause the disk to rotate upon the movement of the lever, means connecting the disk and covers to cause the covers to move upon movement of the disk, and means to move the lever upon the approach of an animal toward the tank.

4. In combination, a tank provided with hinged covers, standards extending upwardly centrally of the tank, a disk rotatably mounted between the standards, a lever pivoted between the standards adjacent the disk, an arcuate rack bar on the lever, a pinion on the disk, the rack bar meshing with the pinion to cause the disk to rotate upon the movement of the lever, cover moving means connected to the disk, means to move the lever in one direction upon the approach of an animal toward the tank to open the covers and spring means to return the lever to its normal position and permit the covers to close.

In testimony whereof I affix my signature in presence of two witnesses.

WILLIAM J. WICHMANN.

Witnesses:
  LOUIS C. BUCHSIEB,
  R. V. GRISWOLD.